United States Patent
Ludwig

(10) Patent No.: US 12,018,773 B2
(45) Date of Patent: Jun. 25, 2024

(54) MOTOR VEHICLE DIRECTIONAL CONTROL VALVE FOR ADJUSTING A FLUID FLOW

(71) Applicant: WOCO Industrietechnik GmbH, Bad Soden-Salmünster (DE)

(72) Inventor: Uwe Ludwig, Bad Soden-Salmuenster (DE)

(73) Assignee: Woco Industrietechnik GmbH, Bad Soden-Salmünster (DE)

( * ) Notice: Subject to any disclaimer, the term of this patent is extended or adjusted under 35 U.S.C. 154(b) by 0 days.

(21) Appl. No.: 17/566,222

(22) Filed: Dec. 30, 2021

(65) Prior Publication Data

US 2022/0213962 A1    Jul. 7, 2022

(30) Foreign Application Priority Data

Jan. 5, 2021  (DE) .......................... 102021100075.0

(51) Int. Cl.
*F16K 5/04* (2006.01)
*F16K 11/085* (2006.01)
*F16K 27/06* (2006.01)

(52) U.S. Cl.
CPC ........ *F16K 5/0478* (2013.01); *F16K 11/0853* (2013.01); *F16K 27/065* (2013.01)

(58) Field of Classification Search
CPC .. F16K 5/0464; F16K 11/0853; F16K 27/065; F16K 5/0478
See application file for complete search history.

(56) References Cited

U.S. PATENT DOCUMENTS

| | | | |
|---|---|---|---|
| 2,310,583 A * | 2/1943 | Johnson | F16K 5/0464 251/317 |
| 6,315,267 B1* | 11/2001 | Zajac | F01P 7/16 251/316 |
| 2006/0118066 A1* | 6/2006 | Martins | F16K 11/0856 123/41.08 |

FOREIGN PATENT DOCUMENTS

| | | |
|---|---|---|
| CN | 110173574 A | 8/2019 |
| CN | 110185812 A | 8/2019 |
| DE | 551 241 | 5/1932 |
| DE | 690270 C | 4/1940 |
| DE | 1 76 433 | 8/1964 |
| DE | 102009049867 A1 | 4/2011 |
| DE | 10 2013 105 321 A1 | 11/2014 |
| DE | 20 2017 000 564 U1 | 4/2017 |
| DE | 102016118133 A1 | 3/2018 |
| EP | 2 314 900 A2 | 4/2011 |

(Continued)

OTHER PUBLICATIONS

DE102009049867A1 machine translation (Year: 2011).*

(Continued)

*Primary Examiner* — Michael R Reid
(74) *Attorney, Agent, or Firm* — Banner & Witcoff Ltd.

(57) ABSTRACT

A directional valve adjusts a fluid flow, such as a coolant flow. The valve includes a valve housing having at least two fluid openings, a valve member adjustable to close and at least partially open the at least two fluid openings, and a seal mounted in a mounting direction in a seal support of the valve member or the valve housing. The seal support and the seal are form-matched to each other such that the seal and the seal support engage behind each other in a barb-like manner with respect to the mounting direction.

18 Claims, 7 Drawing Sheets

(56) References Cited

FOREIGN PATENT DOCUMENTS

FR 1407362 A 7/1965
WO WO 2019/206510 A1 10/2019

OTHER PUBLICATIONS

Office Action dated Sep. 29, 2021 for German Patent Application No. 10 2021 100 068.8, (12 pp.), note: pp. 1 and 2 are English language Exglanations to Section C. Result of Determination Document.
Office Action dated Sep. 21, 2021 for German Patent Application No. 10 2021 100 075.0, (8 pp.), note: pp. 1 and 2 are English language Explanations to Section C. Result of Determination Document.

\* cited by examiner

MOTOR VEHICLE DIRECTIONAL CONTROL VALVE FOR ADJUSTING A FLUID FLOW

RELATED APPLICATION

This application claims the benefit and priority of German Patent Application DE 10 2021 100 075.0, filed Jan. 5, 2021, which is incorporated by reference herein in its entirety.

TECHNICAL FIELD

The application relates to a directional valve, in particular a multi-directional valve, such as a 3/2- or 4/2-directional valve, for adjusting a fluid flow, such as a coolant flow, for example of a motor vehicle. Furthermore, the application relates to a motor vehicle fluid flow control system, such as a motor vehicle thermal management system, having such a control valve.

BACKGROUND

Generic multi-directional valves are used, for example, in a motor vehicle for its thermal management and are used, in particular, to direct coolants, such as water or oils. In the case of known multi-directional valves with rotary pistons as the valve member, there are sealing problems and high frictional forces between the valve member and the valve housing, in particular the valve seat. Therefore, relatively powerful actuators must be used to operate the valve members.

A motor vehicle multi-directional valve with a rotary piston valve member is disclosed, for example, in DE202017000564U1. The valve housing has a plurality of fluid connection ports oriented radially with respect to the direction of rotation of the valve member. From the radially outer circumference are multi-part seal packs consisting of a sleeve-shaped holder, a sealing element made of elastomer, and a receiving sleeve that receives the holder and the sealing element. Guides for the sealing packs are provided on the inner circumference of the fluid connection ports, which can be positioned so that the sealing elements face the interior of the valve housing. Furthermore, the sealing elements have a curvature so that their sealing surfaces facing the interior space are adapted to an inner radius of the valve housing interior space.

The motor vehicle multi-directional valve according to DE202017000564U1 has proved to be disadvantageous, particularly due to its large number of parts and complex assembly. In addition, the design allows only a predetermined assembly of the sealing package. There is also virtually no scope for design in the configuration of the seal package. For example, it is not possible to cover or line further valve housing interior surfaces by means of the sealing package.

Furthermore, multi-directional valves with a two-part valve member consisting of a closure part and an adjusting part are known from DE102016118133A1 and EP2314900A1, with sealing elements being arranged on the face of the closure part. In DE102016118133A1, the seal is realized by a coating with a sealing effect. The main disadvantage of this is that the surface of the sealing part has to be coated over a large area. Furthermore, the coating has no elasticity for improved formation of a sealing contact. In EP2314900A1, a sealing ring is arranged in a groove provided in the sealing part, which can come into contact with the valve housing seat. On the one hand, mounting thin and poorly dimensionally stable sealing O-rings has proven to be disadvantageous. On the other hand, the O-rings tend to become detached from the groove if they are not held in place by additional complex fastening means.

SUMMARY

It is an object of the application to overcome the disadvantages of the prior art, in particular to improve a directional valve for a motor vehicle fluid flow in such a direction that a simpler and/or more flexible mounting of a seal on the valve housing and/or valve member is possible, in particular with improved mounting strength.

Accordingly, a directional valve is provided for adjusting a fluid flow, such as a coolant flow, in particular between at least two switching states. The directional valve may, for example, be a multi-directional valve, such as a 3/2-directional or a 4/2-directional valve. The directional valve according to the embodiments is used, for example, in a motor vehicle for its thermal management. Accordingly, the directional valve may be a motor vehicle directional valve, in particular a motor vehicle thermal management valve, such as a motor vehicle coolant control valve, which is used, for example, in a motor vehicle fluid flow control system, such as a motor vehicle thermal management control system, in particular a motor vehicle cooling circuit. The fluid flow may be, for example, coolant, water, oil or the like.

The directional valve according to the embodiments comprises a valve housing. The valve housing can delimit a valve chamber through which the fluid flow can be passed and/or in which a valve member can be movably mounted for setting the various switching states. The valve housing may comprise at least two, in particular three or four, fluid connections, such as openings or passages, in particular at least one fluid inlet and at least one fluid outlet.

Furthermore, the directional valve comprises an adjustable valve member. For example, the valve member may be coupled to an actuator, in particular in a force transmitting manner, which is designed to actuate or position the valve member. The valve member may, for example, be a rotary piston rotatable mounted with respect to a rotational adjusting axis. Furthermore, it is possible that the valve member is a piston mounted translationally with respect to an actuation axis.

According to one aspect, the directional valve further comprises a seal mounted in a mounting direction in a seal support of the valve member or the valve housing. The seal and the seal support form-fit engage to prevent the seal and the valve member or valve housing from moving away from each other in a direction opposite to the mounting direction. The form-fit engagement between the seal and seal retainer prevents relative freedom of movement in the mounting condition against the mounting direction. This ensures that the seal remains reliably within the seal support during operation of the directional valve. Furthermore, additional fastening means or measures, such as adhesion promoters or the like, can be dispensed with due to the form-fit engagement.

In an exemplary embodiment of the directional valve, the seal support and the seal are form-matched to each other in such a way that the seal and the seal support engage behind each other in a barb-like manner with respect to the mounting direction. In other words, either the seal support or the seal, or both, have a barbed structure that engages behind the other component with respect to the mounting direction. For example, the seal support and/or the seal may have a barb oriented transversely to the direction of assembly, in particular protruding or recessed, which provides a blockage of movement for the other component in each case. For the understanding within the meaning of the present application of the term barb, it is sufficient that the barb extends transversely to the mounting direction, although it is also possible that the barb extends both transversely to the mounting direction and is directed rearwardly counter to the mounting direction.

In another exemplary embodiment of the directional valve, the seal is made from a single piece, in particular by means of an injection molding process. Furthermore, the seal has a barb structure made in one piece therewith, by means of which the seal is firmly attached to the valve member or the valve housing, in particular free of adhesion promoters and/or free of further fastening means or measures. Thus, a particularly resistant seal can be produced in a simple manner in terms of manufacturing technology, which is easy to assemble and at the same time is fixed in position to the valve member or the valve housing in the corresponding seal support. According to an exemplary further development, the seal is injection-molded into the seal support. The production can thus be carried out in such a way that an injection molding tool is fed to the valve member or the valve housing, depending on the component in which the seal support is formed, and the injection molding material, in particular the plastic material, is injected into the seal support in such a way that, at the same time as the seal is produced, its position secure, in particular barb-like rear-engaging, fastening in the seal support is realized.

According to a further exemplary embodiment of the directional valve, the barb structure is formed as a protrusion, in particular a rotational protrusion, which projects from the seal and has a web portion, in particular of constant diameter, and a retaining portion, in particular a circumferential retaining portion, which projects transversely to the longitudinal extent of the protrusion. The retaining section projecting transversely to the longitudinal extent, in particular projecting radially, can thus hook with the valve member or the valve housing in the assembly state in the seal support, so that a blockade of movement is formed to prevent the seal from moving away from the valve member or the valve housing. The manufacture of the web portion and the protruding retaining portion can be realized, for example, by means of the injection molding process, in which the seal support is provided with a web receptacle and a retaining receptacle which protrudes transversely with respect to the direction of longitudinal extension, in particular radially, with respect to the web receptacle, which are filled with the injection molding material, in particular plastic material, in the injection molding process, so that the form-fit locking insertion, in particular the hooking structure, is already formed during manufacture.

In a further exemplary embodiment of the directional valve, the seal has at least two, in particular a plurality of, protrusions arranged at a particularly uniform distance from one another, in particular of the same shape. In this way, the fastening force, in particular the hooking force, can be distributed between the seal and the seal support or valve member or valve housing. The at least two fastening anchors formed in this way act particularly effectively against unintentional disassembly of the seal. For example, the seal is implemented as a sealing ring. The at least two, in particular the plurality of, protrusions can thus be arranged ring-like relative to one another.

In an exemplary further development of the directional valve, the seal support is annular, in particular annular-groove-shaped. The seal support can be realized by a groove or recess set back relative to a surface, for example a face surface of the valve member or a valve housing inner wall, but can also be given by a particularly predefined surface section, in particular without a groove or recess, which is provided for receiving and/or for abutting the seal. According to an exemplary further development, the seal support has at least one form-fit opening for receiving the protrusion with respect to which the at least one protrusion of the seal is form-fitted. For example, the seal support comprises at least two, in particular a plurality of, in particular equally spaced, form-fit openings. In an exemplary embodiment, the number of form-fit openings corresponds to the number of seal protrusions. In the event that the seal is manufactured by means of an injection molding process and is injected into the seal support, the number of seal protrusions automatically adapts during manufacture to the number of form-fit openings provided in the valve member or the valve housing.

According to an exemplary further development, the form-fit opening is shaped in such a way that the seal protrusion and the seal support form-fit opening engage behind each other in a barb-like manner with respect to the mounting direction of the seal. For example, the seal support may be shaped as an annular groove and the seal may have a substantially annular shape, in particular an annular seal base body. The seal protrusion projecting from the seal base body and the seal support form-fit opening, which are correspondingly shape-matched to one another, serve for barb-like rear engagement, which can be achieved in a simple manner in terms of production technology, for example, via the injection molding process. The seal base body of the seal may mainly serve to form the sealing contact with the corresponding component to be cooperated. In other words, the seal is arranged on the valve member or the valve housing in such a way that its basic sealing body faces or is associated with the respective other component and the barb structure is rearward or away from the respective other component.

According to a further exemplary further development, the form-fit locking opening has a web receptacle associated with the web section of the seal and a retaining receptacle associated with the retaining section and projecting transversely to the longitudinal extent of the form-fit locking opening, in particular circumferentially, relative to the web receptacle. The web receptacle and the web section and/or the retaining receptacle and the retaining section can be matched in shape to one another.

In a further exemplary embodiment of the directional valve, the seal support is arranged close to the edge in a sealing part of the valve member arranged to make sealing contact with the valve housing, in particular on its end face or sealing contact surface facing the valve housing, or is formed close to the fluid opening in a valve housing wall bounding the at least two fluid openings. The local assignment of the seal support and thus of the seal to the critical positions for the sealing or the closed state of the directional valve has the advantage that, on the one hand, the best possible sealing effect is achieved and, on the other hand, a cost-effective directional valve can be manufactured, since the seal need only be provided where it is actually required. It was found that the critical positions are, on the one hand, radially on the outside, i.e. close to the edge, of the sealing part of the valve member and/or immediately adjacent, i.e. close to the fluid opening, in the valve housing wall.

According to a further aspect of the embodiments, which can be combined with the preceding aspects and exemplary embodiments, a directional valve is provided for adjusting a fluid flow, such as a coolant flow, in particular between at least two switching states. The directional valve may be, for example, a multi-directional valve, such as a 3/2-directional or a 4/2-directional valve. The directional valve according to the embodiments is used, for example, in a motor vehicle for its thermal management. Accordingly, the directional valve may be a motor vehicle directional valve, in particular a motor vehicle thermal management valve, such as a motor vehicle coolant control valve, which is used, for example, in a motor vehicle fluid flow control system, such as a motor vehicle thermal management control system, in particular a motor vehicle cooling circuit. The fluid flow may be, for example, coolant, water, oil or the like.

The directional valve according to the embodiments comprises a valve housing. The valve housing can delimit a valve chamber through which the fluid flow can be passed and/or in which a valve member can be movably mounted for setting the various switching states. The valve housing can have at least two, in particular three or four, fluid connections, such as openings or passages, in particular at least one fluid inlet and at least one fluid outlet. The at least two fluid openings are fluidly connected to a valve interior defined by the valve housing. The fluid flow can be guided through the valve interior space. Furthermore, the valve housing comprises at least one seal support. The seal support is adapted to receive a seal that can form a sealing contact with a valve member of the directional valve.

Further, the directional valve comprises an adjustable valve member. For example, the valve member may be coupled to an actuator, in particular in a force transmitting manner, which is configured to actuate or position the valve member. The valve member may, for example, be a rotary piston rotatable mounted with respect to a rotational adjusting axis. Furthermore, it is possible that the valve member is a slide valve mounted in a translational manner with respect to an adjusting axis. The valve member is set up and assigned to the valve housing in such a way that, for closing the fluid openings, the valve member comes into sealing contact with a seal to be arranged or arranged in the seal support. For forming the sealing contact, an especially radial contact pressure can build up between the valve member and the seal.

According to the further aspect of the embodiments, the directional valve further comprises a seal injected from the interior into the at least one seal support by means of an injection molding process, in particular by means of a plastic injection molding process, and manufactured from one piece. By means of the injection molding process, it is possible in a particularly simple manner in terms of production technology to produce a seal, on the one hand, and to simultaneously perform the assembly, on the other hand, already during the production, namely by injecting the seal into its assembly position. The use of the injection molding process also makes it possible to dispense with fastening means or measures. The injection molding process can be used to produce a form-fit connection or barb structure in a simple manner, so that adhesion promoters for fastening the seal to the valve member in particular can be dispensed with. In addition, the injection molding process can be used to create flexible seal geometries in order to be able to produce seals for different requirements and directional valve geometries. Another advantage of injecting the seal from the valve interior is that the external shape, connections, etc. of the directional valve can be identical across different directional valve types or areas of application, and the internal contour or geometry of the valve housing can be individually adapted depending on the area of application, requirements, such as flow rate, pressure drop, etc. The injection molding process can also be used to produce flexible sealing geometries for different directional valve geometries. By means of the injection molding process, it is possible to react flexibly to such changes in the internal geometry of the directional valve and, at the same time, to produce a corresponding seal with high quality and at low cost and, above all, to fasten it reliably to the valve housing wall.

In an exemplary embodiment, the seal is shaped in such a way that the seal is form-fitted to an inner contour of the valve housing wall, and in particular merges continuously and/or without protrusion into the wall contour. In other words, the seal support may be recessed with respect to the wall contour of the valve housing wall so that the seal is also recessed with respect to the wall contour and/or merges flush therewith.

According to a further exemplary further development of the directional valve, the seal is arranged in the at least one seal support in such a way that a rotation of the seal relative to the seal support with respect to the adjusting axis of the valve member and/or a translation of the seal relative to the seal support in the direction of the adjusting axis are/is prevented. This ensures that the seal is always in the correct position to best ensure a seal and thus a closure of the desired fluid opening.

In a further exemplary embodiment, the seal and the seal support form a form-fit engagement, in particular in the form of a spring-groove connection. The form-fit engagement may be configured to prevent the seal and the seal support from moving away in a direction opposite to the mounting direction or the injection direction, respectively.

According to another exemplary embodiment of the directional valve, the seal lines the valve housing wall over a large area, in particular at least 50%, at least 60%, at least 70% or at least 80%, of the valve housing wall. The seal may further be provided with a coating that reduces static friction between the seal and the valve member. For example, the seal including the coating may be manufactured in a 2-component injection molding process. Furthermore, it is possible that the coating reducing the static friction is provided in sections on those sections of the valve housing wall in which the valve member does not assume a closed state, but which are associated with an open state or are associated with an amplitude of movement of the valve member.

According to another aspect of the embodiments, which is combinable with the preceding aspects and exemplary embodiments, the directional valve comprises a slotted link guide adapted to urge the valve member into a sealing contact switching state with the valve housing and to guide the valve member into a release switching state that is displaced back with respect to the sealing contact switching state. When assuming the sealing contact switching state, the slotted link guide urges the valve member against the valve housing so that a static friction existing between the valve member and the valve housing is continuously increased in particular. For example, the sealing contact switching state is assigned to one of the fluid connections in the valve housing. When leaving the sealing contact switching state, the slotted link guide guides the valve member away from the valve housing so that the static friction existing between the valve housing and the valve member is again reduced, in particular continuously.

An advantage of this aspect is that a particularly low-friction movement of the valve member within the valve housing is made possible in a manner that is easy to construct and manufacture. In this respect, the directional valve according to the embodiments is characterized by low wear and a long service life. Due to the low frictional force during the positioning of the valve member, it is possible to resort to lower-cost and/or lower-power actuators for actuating the valve member. Provided that the sealing contact switching state is assigned to a fluid connection to be closed, the slotted link guide according to the embodiments fulfills two advantageous functions: on the one hand, a low-friction, guided movement of the valve member is made possible during the adjustment of the valve member and, on the other hand, an increased frictional force is built up via the slotted link guide for the fluid-tight closing of the corresponding fluid connection. Since a contact pressure between the valve member and the valve housing only occurs in the closing area, i.e. in the sealing contact switching state, the actuating movement of the valve member is essentially frictionless, so that additional sliding and/or sealing measures can also be dispensed with. Due to the guided movement during the positioning of the valve member by means of the slotted link guide, the valve member is quasi-automatically urged into the sealing contact switching state with the valve housing in order to build up the contact pressure, in particular in the closing area for closing a fluid connection, and is also quasi-automatically guided back out of the sealing contact switching state.

In the case of a rotary piston that is rotatable mounted with respect to an axis of rotation, "urging" can be understood to mean that the slotted link guide pushes the valve member radially outward out of the purely rotational translational movement in order to reach the sealing contact switching state with the valve housing, i.e. in order to overcome a radial distance between the valve member and the valve housing. The "recessed release state" may be understood to mean that the slotted link guide returns the valve member, in particular radially inwardly, to the substantially purely rotational actuating motion. With respect to the piston valve member design, the slotted link guide can displace the valve member transversely, in particular perpendicularly, to the translational actuating movement in order to force it into the sealing contact switching state with the valve housing. When moving back out of the sealing contact switching state, the slotted link guide can guide the piston valve member back to the translational actuating movement direction or path.

In an exemplary embodiment of the embodiments, the slotted link guide has a slotted link path formed in the valve housing, particularly a valve housing base, in which the valve member is guided. For example, the slotted link path is made in one piece with the valve housing. When the valve member is set, it travels along the slotted link path, in particular between the at least two switching states, and during the setting movement in predetermined rotational or axial positions, depending on the valve member design, is urged into a sealing contact switching state and guided out of it again. The fact that the slotted link path can be arranged on the valve member housing or even formed integrally therewith provides a particularly structurally simple design of the slotted link guide.

According to an exemplary further development of the directional valve according to the embodiments, the slotted link path runs in such a way that, when assuming the sealing contact switching state, the valve member is deflected transversely to its adjusting axis in the direction of a sealing contact surface of the valve housing, which can, for example, be defined and/or formed by a valve seat. In the case of a rotary piston valve member, the valve member can be deflected radially to the rotational adjusting axis. In the case of a piston valve member, the piston valve member can be deflected transversely to the translational actuation axis. The sealing contact surface of the valve housing can be formed by a valve seat, for example. For example, the valve seat is associated with a fluid connection.

According to a further exemplary further development of the directional valve according to the embodiments, the slotted link guide has a press-on protrusion which extends into the slotted link path, so that when the valve member passes over the press-on protrusion, for example when the valve member passes the press-on protrusion, the valve member is urged by the press-on protrusion into the sealing contact switching state. Accordingly, the press-on protrusion can cause an evasive movement of the valve member, whereby a dimension of the press-on protrusion and thus a movement compensation of the valve member is matched to a distance to be bridged between the valve member and the valve housing, which must be overcome to assume the sealing contact switching state. For example, the slotted link guide can comprise two, three or four press-on protrusions arranged at a distance from each other. One press-on protrusion can be assigned to each fluid connection. In this way, it can be ensured that the slotted link guide of the valve member presses in the direction of the valve member in the area of a fluid connection in each case to form a sealing contact switching state in order to close the corresponding fluid connection in a fluid-tight manner. The sealing contact pressure between the valve member and the valve housing is therefore only built up in the corresponding sealing areas at the fluid connections, i.e. only when it is necessary. In the remaining range of actuating movement, in particular rotational or rotary or translational range of movement, of the valve member, this can run essentially friction-free.

According to a further exemplary embodiment of the directional valve according to the embodiments, the slotted link path is formed by a guide groove introduced into the valve housing, in particular in the valve housing base. Furthermore, the valve member has a guide protrusion acting as a sliding block and cooperating with the guide groove. When the valve member is set, the guide protrusion of the valve member is guided in the guide groove of the valve housing. In other words, the guide protrusion projects into or engages with the guide groove. A cross-section of the guide protrusion may be adapted to an inner cross-section of the guide groove shape.

In an exemplary further development of the directional valve according to the embodiments, the guide groove is essentially annular in shape with respect to the rotational adjusting axis of the valve member, which is in the form of a rotary piston, and has a deflector, in particular two, three or four deflectors distributed in particular uniformly in the circumferential direction, which deflects or deflects the valve member from the annular, regular slotted link path in order to assume the sealing contact switching state. In the case of a translational actable piston valve member, the guide groove can be aligned essentially parallel to the translational adjusting axis and have one, in particular two, three or four points distributed in the translational actuation direction, in particular uniformly, which deflects or displaces the piston valve member transversely to the translational actuation axis. The at least one diverter may further be shaped and/or ensure that the valve member is returned to the regular annular or regular rectilinear actuating path.

According to another aspect of the embodiments, which may be combined with the preceding aspects and exemplary embodiments, the valve member comprises an adjusting part to be connected to an actuator for actuating the valve member, in particular in a force-transmitting manner, and a sealing part for making sealing contact with the valve housing. The adjusting part and the sealing part can be separate, in particular separately manufactured, components.

According to this aspect, the sealing part is movably supported relative to the adjusting part by means of a rail guide. The adjusting part may be the component that is directly adjusted by the actuator, while the sealing part is mounted to the adjusting part without a separate actuator. A relative movement possibility of the sealing part relative to the adjusting part is made possible by means of the rail guide, which can be moved, for example, when the valve member is set, i.e., when the valve member is moved between the different switching states, between a sealing contact switching state in which the sealing part is positioned relative to the adjusting part by means of the rail guide in such a way that a particularly increased frictional contact is created between the valve member and the valve housing, in particular valve seat, for example in the area of a fluid connection. The rail guide makes it possible to decouple the adjusting part and the sealing part in a cost-effective and easy-to-implement manner, so that the rail guide can be used to flexibly adjust the relative movement of the adjusting part with respect to the sealing part in order to build up a desired sealing contact pressure at a specific position, in particular in a specific rotational or rotary position of the valve member or at a specific axial actuating position. Thus, a particularly low-friction assumption of the sealing contact within the valve housing can be made possible in a manner that is easy to construct and manufacture. In this respect, the directional valve according to the embodiments is characterized by low wear and a longer service life. Due to the low frictional force when the sealing contact is engaged, less expensive and/or lower power actuators can be used for actuating the adjusting part.

In an exemplary embodiment of the directional valve according to the embodiments, the rail guide is implemented by a shape-corresponding protrusion-recess structure on the adjusting part and sealing part. The protrusion-recess structure may have engagement elements on the adjusting part and sealing part that are associated with each other and/or shape-matched to each other in such a way that they can engage with each other to establish the relative mobility of the sealing part with respect to the adjusting part.

In another exemplary embodiment, the valve member may have a sealing contact switching state in which the sealing part is in sealing contact with the valve body, and a release switching state that is recessed with respect to the sealing contact switching state in which the sealing part is moved away from the valve body. For example, the sealing part is urged towards the valve housing to assume the sealing contact switching state. For example, the rail guide may form a type of gear. Accordingly, when assuming the sealing contact switching state, the sealing part can be urged, for example, radially outwardly with respect to the rotational adjusting axis or transversely with respect to the translational actuation axis, so that a distance existing between the sealing part and the valve housing can be bridged, so that the sealing part can come into a press-on sealing contact with the valve housing. When moving away from the sealing contact switching state into the reset release switching state, the sealing part can be moved away from the valve housing again via the rail guide, so that a distance in this respect is produced and friction between the sealing part and the valve housing is reduced, in particular prevented.

According to an exemplary further development of the directional valve according to the embodiments, the sealing part is movably mounted on the control part in such a way that the sealing part is moved away from the valve housing when leaving the sealing contact, such as under the influence of the fluid pressure. Furthermore, it is possible that the sealing part is moved away from the valve housing via a guide device when leaving the sealing contact. As soon as the sealing part is moved away from the sealing contact in order to set a switching state of the directional valve in which a fluid flow through the directional valve is permitted, in particular through a fluid opening associated with the corresponding sealing contact, a fluid pressure builds up at the sealing part, which is displaced by the latter as a result. The utilization of the fluid pressure has, among other things, the advantage that the fluid pressure that is present anyway can be used to set the release switching state, in particular without the need for further components, such as a spring preload, a separate gear or a separate moving means for the sealing part.

In another exemplary embodiment of the directional valve according to the embodiments, the axis or direction of movement of the sealing part is oriented substantially perpendicular to the adjusting axis, in particular to the rotational adjusting axis or to the translational adjusting axis, of the valve member. In this case, the rail guide can serve as a type of gear for converting the various directions of movement between the adjusting part and the sealing part.

In a further exemplary embodiment of the directional valve according to the embodiments, the protrusion-recess structure has a rectilinear guide rail on the sealing part or adjusting part side and a guide carriage of complementary shape thereto on the adjusting part or sealing part side. The guide rail and/or the guide carriage can/can each be made in one piece with the sealing part or the adjusting part, respectively. On the one hand, the form-complementary rail-carriage structure can be manufactured in a simple manner and, on the other hand, it provides a specific assembly of the sealing part and the adjusting part and further provides a direct guide during the relative movement of the adjusting part with respect to the sealing part.

According to a further exemplary embodiment of the directional valve according to the embodiments, the guide rail has an asymmetrical, in particular substantially cruciform, cross-section. Due to the asymmetry, incorrect assembly is avoided. For example, the adjusting part can have a cruciform guide rail oriented transversely to the rotational adjusting axis or translational actuation axis, onto which the guide carriage on the adjusting part side, which is designed, for example, as a shape-complementary cruciform recess, by means of which the adjusting part is pushed or placed onto the guide rail.

According to a further exemplary embodiment of the directional valve according to the embodiments, the slotted link guide and the rail guide are coupled to one another, in particular matched to one another. The slotted link guide and the rail guide can be coordinated with one another in such a way that the rail guide reacts to the slotted link guide in order to assume the sealed-contact switching state and in order to assume the release switching state, which is displaced back with respect to the sealed-contact switching state. The directional valve may be configured, or the slotted link guide and the rail guide may be coordinated and/or coupled, such that the slotted link guide activates the rail guide.

According to an exemplary further development of the directional valve according to the embodiments, the slotted link guide is arranged to activate the rail guide for assuming the sealing contact switching state. This can be realized in that the slotted link guide causes the sealing part to be displaced relative to the adjusting part and to be urged into sealing contact with the valve housing. The assumption of the sealing contact switching state can, for example, take place in such a way that the sealing part is displaced relative to the adjusting part and is urged in the direction of the valve member to build up a sealing contact pressure and in the opposite direction to leave the sealing contact switching state and assume the release switching state.

According to a further exemplary further development of the directional valve according to the embodiments, the sealing part performs an eccentric movement along the slotted link path when the valve member is set. For example, the sealing part performs an eccentric movement in such a way that the sealing part is urged into the sealing contact switching state, in particular by a diverter or a press-on protrusion, and is displaced back out of the sealing contact exclusively under the influence of the fluid pressure. For example, the sealing part has the previously described guide protrusion acting as a sliding block and cooperating with the guide groove in the valve housing. Depending on the rotational or rotary position of the rotary piston valve member, or depending on the axial position along the translational adjusting axis and depending on whether or not the guide protrusion of the sealing part is located in the area of a gate or a press-on protrusion, the sealing part is urged into a sealing contact pressure state with the valve housing or is moved back therefrom. The rail guide and the slotted link guide may be coordinated so that the sealing part is brought into sealing contact with the valve housing in each case in the region of the fluid openings that are to be closed off, for example, in order to shut off or reduce a fluid flow.

According to another exemplary embodiment, the valve member is adjustable between a closing state in which the valve member is urged into sealing contact with the valve housing and in which the seal is active to fluid-tightly close one of the fluid openings, and an opening state in which the valve member is recessed away from the valve housing and in which the seal is inactive to at least partially open the fluid opening.

In an exemplary embodiment, applicable to all of the previously described aspects or exemplary embodiments of directional valves or motor vehicle directional valves according to the embodiments, the valve member is configured free of a fluid passage. In other words, the valve member may be configured such that when a fluid flow is allowed to pass through the directional valve, i.e., when the directional valve is in an open state, the fluid flow passes the valve member. For example, the valve member has an at least sectional rotational outer contour so that the lowest possible dynamic pressure is formed and/or the fluid flow can flow past the valve member with as little friction as possible.

According to a further aspect of the embodiments, which can be combined with the preceding aspects and exemplary embodiments, there is provided a motor vehicle fluid flow control system, in particular a motor vehicle thermal management fluid flow control system, such as a motor vehicle cooling circuit. The motor vehicle fluid flow guidance system comprises a directional valve according to the embodiments, for example according to one of the aspects or exemplary embodiments described above. Further, the fluid flow routing system may be connected to a fluid source, such as a coolant reservoir, and/or a motor vehicle component to be cooled, such as an engine component or a motor vehicle battery.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, embodiments, like any reference numerals, may correspond throughout the different drawings.

DETAILED DESCRIPTION OF THE EMBODIMENTS

Figure 1:
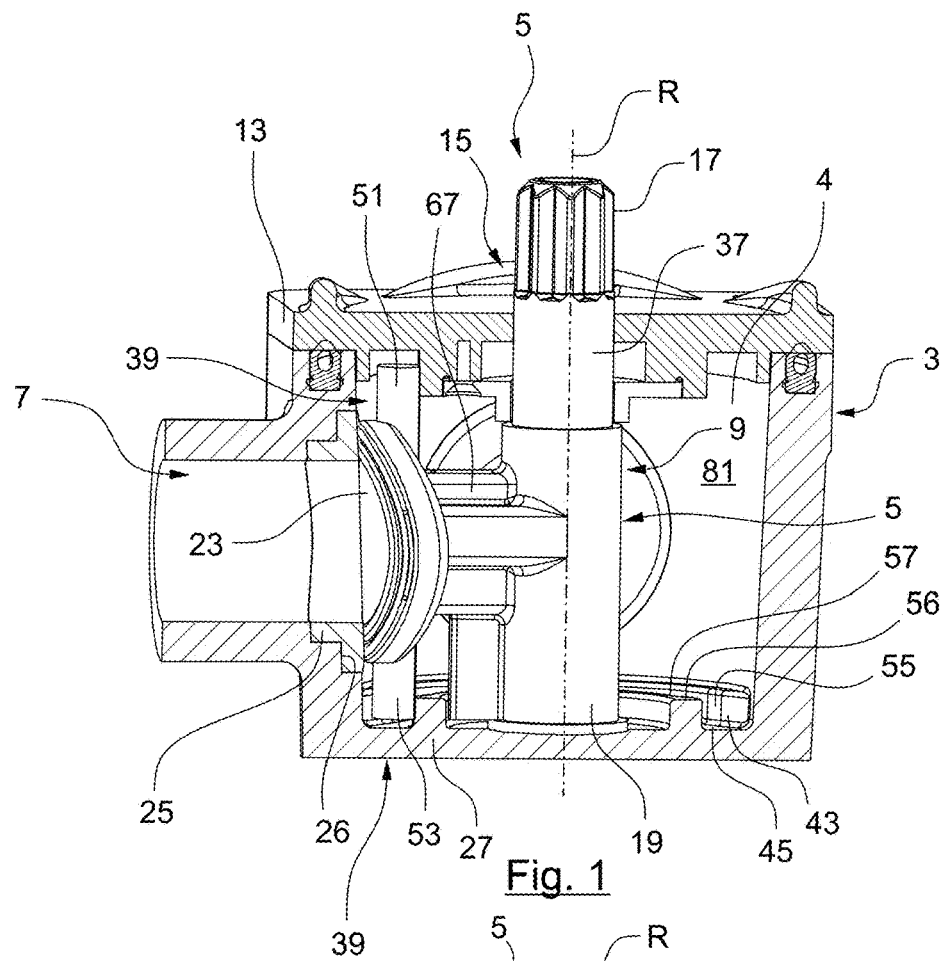
FIG. 1 is a perspective sectional view of an exemplary embodiment of a directional valve according to the embodiments.

In the following description of exemplary embodiments on the basis of the accompanying figures, a directional valve according to the embodiments, which is in particular a motor vehicle directional valve for adjusting a fluid flow, such as a coolant flow in a motor vehicle, in particular a motor vehicle engine, is generally provided with the reference numeral 1.

The directional valve 1 according to FIG. 1 essentially comprises the following main components: a valve housing, through which a fluid flow can flow; and an adjustable valve member 5, which according to the exemplary embodiment is realized as a rotary piston, which is rotatable with respect to a rotational adjusting axis R for adjusting various switching states of the directional valve 1.

The valve housing 3 comprises a plurality of fluid connections or fluid openings 7, 9, 11, of which at least one fluid inlet and one fluid outlet are present. FIG. 1 shows that the valve housing 3 is open at the top and is sealed, in particular fluid-tight, by means of a valve cover 13. The fluid cover 13 has a central through opening 15 through which the valve member 5 extends in a fluid-tight manner and in which it is rotatably mounted so that the valve member 5 can be coupled in a force-transmitting manner to an actuator not shown. The actuator serves to apply the necessary actuating force for actuating the valve member 5, which is required to set the various switching states of the directional valve 1. At an end of the valve member 5 projecting from the valve cover 13, the latter can form a force transmission part 17 associated with the actuator.

In the exemplary embodiment according to FIG. 1, the valve member 5 comprises an adjusting part 19 to be coupled to an actuator in a force-transmitting manner, which adjusting part 19 has the force transmission part 17, and a sealing part 21 movable relative to the adjusting part 19, which is designed for the purpose of a sealing contact switching state, in which the sealing part 21 closes one of the fluid openings 7, 9, 11 in a fluid-tight manner, and also a release switching state, in which the sealing part 21 opens the fluid openings 7, 9, 11, so that a fluid flow through the respective openings 7, 9, 11 is permitted.

The valve housing 3, which is rotationally shaped and has essentially a cup shape, has a closed valve housing base 27. In the valve housing base 27, a central pivot bearing 29 is provided for the valve member 5, in particular its adjusting part 19.

The assumption of the sealing contact switching state for fluid-tight closing of the fluid openings 7, 9, 11 as well as also the release of the individual fluid openings 7, 9, 11, i.e. the assumption of the release switching state, is achieved by means of a coupling and matching of a slotted link guide 39 and a rail guide 41. The slotted link guide 39 serves to urge the valve member 5, in particular the sealing part 21, into the sealing contact switching state with the valve housing 5 and to guide the valve member 5, in particular the sealing part 21, out of the sealing contact switching state into a reset release switching state.

The rail guide 41 thereby acts as a kind of gear for converting a change in movement imposed by the slotted link guide into a displacement of the sealing part 21. The slotted link guide 39 has a slotted link path 43 formed in the valve housing 3, namely the valve housing base 27, and made in one piece with the valve housing 5, in which the valve member 5, in particular the sealing part 21, is guided. The slotted link path 43 is formed by a guide groove 45 formed in the valve housing 3, which is oriented in the circumferential direction with respect to the rotational adjusting axis R. The guide groove 45 forms a closed ring in the circumferential direction so that the sealing part 21 guided therein can be continuously adjusted 360°. The sealing part 21 is guided and supported within the guide groove 45 by means of a guide protrusion 51, 53 provided on an upper side 47 oriented in the direction of the rotational adjusting axis R and on the opposite lower side 49 of the sealing part 21. It is also conceivable that the sealing part 21 has only a single guide protrusion 51, 53. The guide protrusion 51, 53 projects into the guide groove 45 in the direction of the rotational adjusting axis R and slides along the guide groove 45 during a rotational positioning movement of the valve member 5 in the radial direction. In this case, the guide protrusion 51, 53 acts as a sliding block and cooperates with the guide groove 45 to support and guide the valve member 5. In accordance with the embodiments, a directional valve with significantly reduced friction between the valve member 5 and the valve housing 3 is provided in a structurally simple manner, so that wear on the components is significantly reduced and less expensive actuators can be used, while at the same time ensuring sufficient tightness in the sealing contact switching state. The advantages are achieved, among other things, by applying a particularly radial contact pressure for sealing the fluid openings 7, 9, 11 only when it is necessary, i.e. when the directional valve 1 is switched in such a way that a fluid opening 7, 9, 11 is to be closed.

Figure 2:
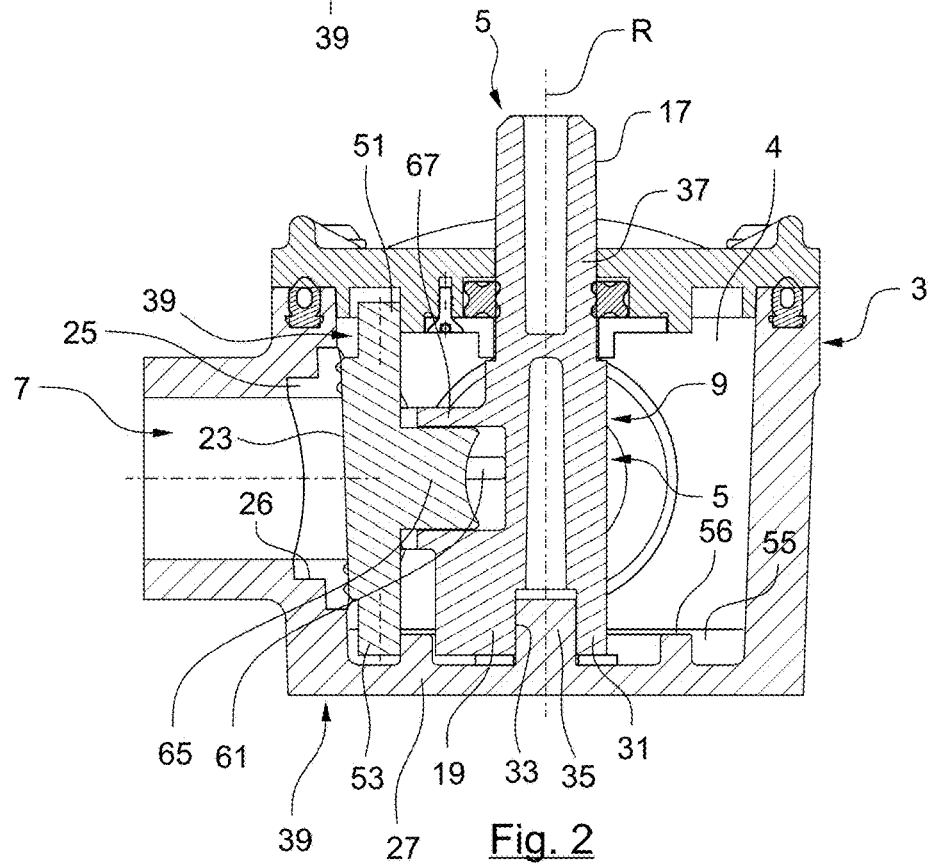
FIG. 2 is a side view showing a further exemplary design of a directional valve according to the embodiments.

FIG. 2 shows a side view of a further exemplary embodiment of a directional valve 1. FIG. 2 shows the rotary bearing 29, which has a bearing recess 33 bounded by a wall 31, in particular a circumferential wall 31, into which a bearing journal 35 of the valve housing extends. The bearing journal 35 is rotatable received within the bearing recess 33. Further, the bearing journal 35 is oriented substantially concentrically with respect to a shaft 37 of the adjusting part 19 extending along the axis of rotation R.

The valve housing 3 comprises a seal support 26 associated with the fluid opening 7, in which an annular seal 25 made in one piece is arranged. The seal 25 has mostly an L-shape in cross-section and is injected from the valve interior 81 into the seal support 26 by means of an injection molding process. The seal support 26 and the seal 25 are arranged concentrically with respect to the fluid opening 7 and circumferentially delimit the latter. In the closed state, as can also be seen in FIG. 2, the seal 25 is active and the sealing part 21 forms a sealing contact with the seal 25. As can be seen in particular from the following FIG. 3, the seal 25 is form-fitted to the inner contour of the valve housing wall, so that in the circumferential direction and also in the direction of the rotational adjusting axis R the seal 25 merges continuously into the wall contour without protrusion, in particular so that the seal 25 does not impair the actuating movement of the valve member 5.

Figure 3:
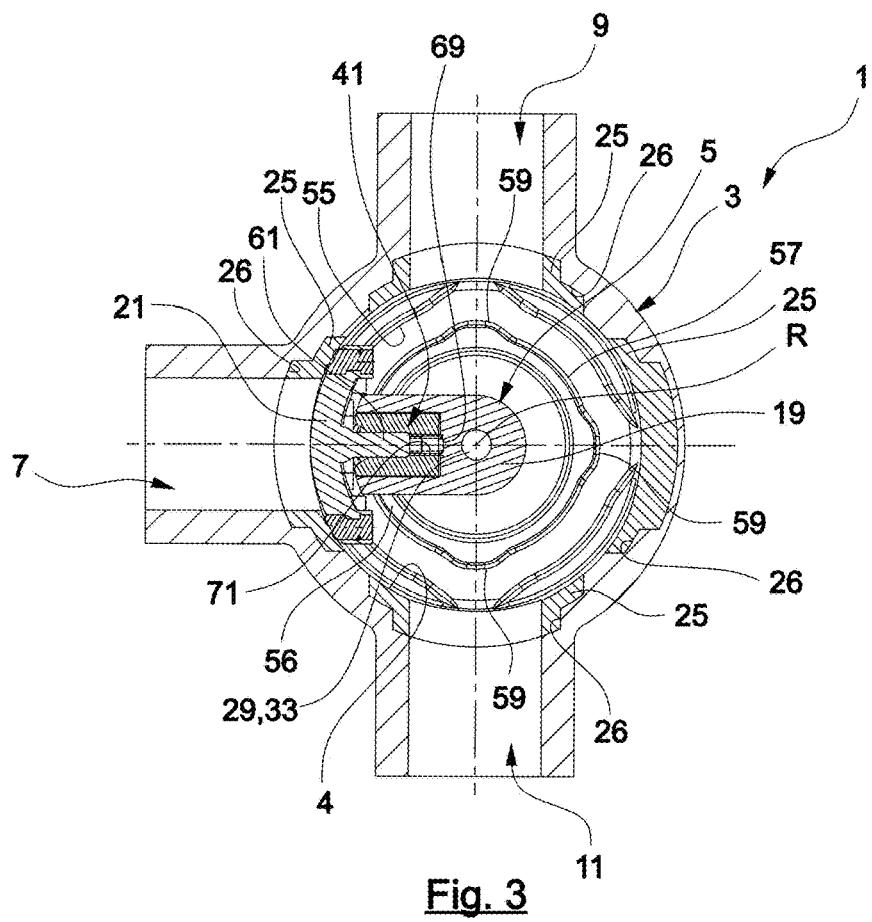
FIG. 3 is a further sectional view of the directional valve of FIGS. 1 and 2.

FIG. 3 shows a top view of a valve housing 3 with mounted valve member 5, from which the slotted link guide 39 and the rail guide 41 can be seen. According to FIG. 3, the guide groove defining the slotted link path 43 runs in the circumferential direction and concentrically with respect to the rotational adjusting axis R and is bounded by two groove walls 55, 57 spaced apart in the radial direction. The radially inner groove wall 55 is part of a circumferential web 56 or protrusion which forms or bounds the guide groove 45. The guide protrusion 53, 51 may be shape-matched with respect to a cross-section, particularly a radial cross-section, of the guide groove 45 so that when the valve member 5 is positioned and the guide protrusion 51, 53 travels along the slotted link path 43, the guide protrusion 53, 51 may be in sliding contact with the groove walls 55, 57. The guide groove 45 is adjusted, or rather the sealing part 21 and the guide groove 45 are adjusted to each other, so that when the valve member 5 is moved in the area between each two adjacent fluid openings 7, 9, 10, 11, there is no radial contact pressure and thus radial frictional resistance exist between the sealing part 21 and the valve housing 3. In other words, the guide groove 45 is dimensioned such that the sealing part 21 is set back radially inwards with respect to a sealing contact switching state in which the sealing part can come into fluid-tight sealing contact with the valve housing 3, so that there is no frictional contact between the sealing part 21 and the valve housing 3. Thus, there is a radial distance between sealing part 21 and valve housing inner wall 4.

To ensure sufficient sealing contact for fluid-tight closure of the fluid openings 7, 9, 10, 11, the guide groove in the exemplary design according to FIG. 3 has four points or press-on lugs 59 distributed in the circumferential direction with respect to the rotational adjusting axis R. The press-on protrusions 59 are arranged on the radially inner groove wall 57 and extend radially outward with respect to the rotational adjusting axis R. Each press-on protrusion 59 is also associated with a respective fluid opening, 7, 9, 10, 11 and is oriented concentrically with respect to a central axis through the respective fluid opening 7, 9, 10, 11, so that, for assuming the sealing contact switching state in the course of a rotary actuating movement of the valve member 5 about the rotational adjusting axis R, the sealing part 21 is urged radially outwardly by the press-on protrusions 59 in the direction of the valve housing 3 in order to build up a radial contact pressure for fluid-tight closure of the respective fluid openings 7, 9, 10, 11. Accordingly, the contact press-on protrusions 59 cause the sealing part 21 to be deflected or deflected transversely, in particular radially, with respect to the axis of rotation. The relative movement option of the sealing part 21 relative to the adjusting part 19 is realized, as already described, by means of the rail guide 41.

Referring again to FIG. 2, it can be seen that the rail guide 41 is implemented on a protrusion-recess structure on the adjusting part 19 and sealing part 21, which, according to FIG. 1, has a straight guide rail 61 on the adjusting part side, which, according to FIG. 1, is formed by a pair of guide rail elements extending in parallel, and comprises a guide carriage 71 on the sealing part side, which is complementary in shape to the guide rail 61. According to FIG. 1, the guide carriage 71 is arranged on an inner side of a guide part 65 facing and associated with the adjusting part 19 by means of a recess which is adapted in shape with respect to the guide rail 61, which guide part 65 is adapted in shape with respect to a guide part 67 on the adjusting part side facing and associated with the sealing part 21 and is pushed or plugged onto the latter. As a result of the fact that the press-on protrusions 59 are assigned to and face the fluid openings 7, 9, 10, 11, the adjusting part 19 is urged radially outward by the press-on protrusions 59 and by means of the guide rail-guide carriage structure on the adjusting part 19 and the sealing part 21 to assume the sealing contact switching state in order to build up a radial contact pressure.

In the sealing contact switching state according to FIG. 3, the sealing part 21 is urged radially outward with respect to the adjusting part 19 by the slotted link guide 39 and by means of the rail guide 41 into sealing contact with the valve housing inner wall 4 in order to build up a radial contact pressure with respect to the valve housing inner wall 4 so that the fluid opening 7 is closed as fluid-tightly as possible. As already mentioned, the radially outward urging of the sealing part 21 relative to the adjusting part 19 is effected by the cooperation of the slotted link guide 39 and rail guide 41. The guide protrusion 53 of the sealing part 21, which is guided within the guide groove 45 and accommodated therein, is deflected radially outward in a form-fitting manner by means of the press-on protrusion 59, which is associated with the fluid opening 7, as a result of which the corresponding guide rails and guide carriages on the sealing part and closing part slide along one another via the rail guide 41 in order to move the entire sealing part 21 radially outward. The increased radial distance between the sealing part 21 and the rotational adjusting axis R can be seen, for example, by the radial distance of the guide rail 61 on the sealing part side relative to the adjusting part 19 within the recess 69, which forms the guide carriage 71, compared with the design shown in FIG. 5, in which the valve member is shown in the pivoting range between two sealing contact closing states.

Figure 4:
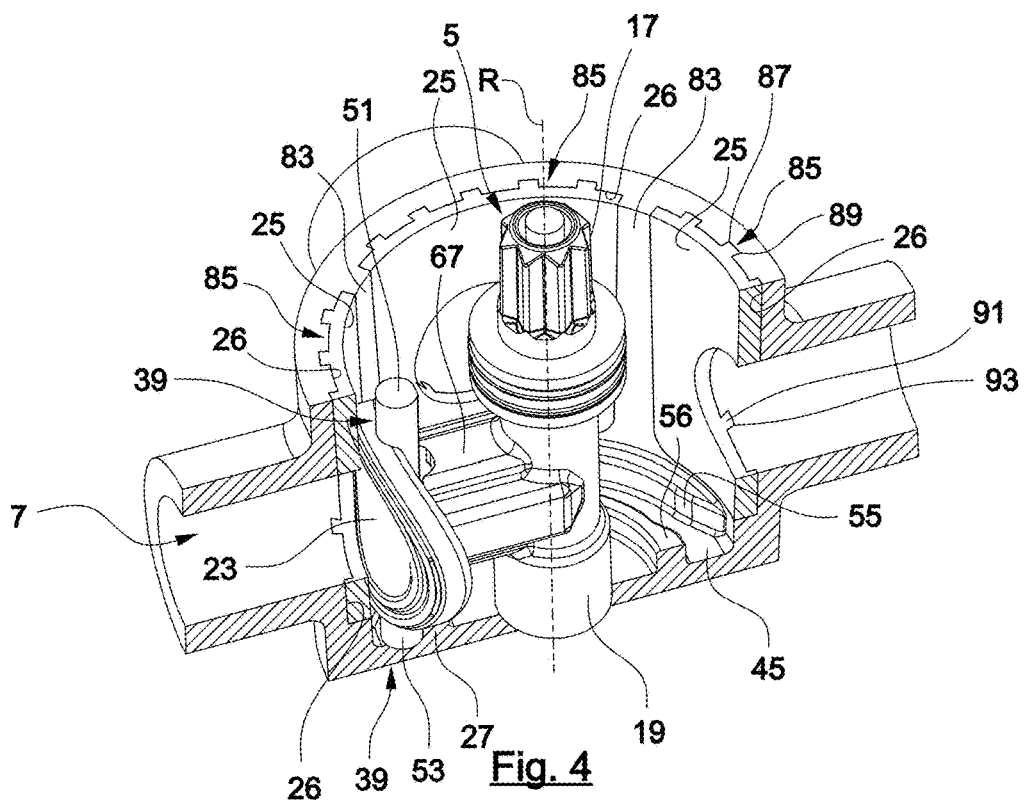
FIG. 4 is a perspective sectional view of a further exemplary design of a directional valve according to the embodiments.

The valve housing 3 of FIG. 4 differs from the previous embodiments with respect to the design of the seal support 26 as well as the seal 25. As can be seen in FIG. 4, the directional valve 1 comprises a total of 4 seals 25 (3 of which are shown), which are arranged at a constant distance from each other in the circumferential direction with respect to the rotational adjusting axis R. The seals 25 are arranged in a constant distance from each other. The seals 25 according to FIG. 4 line the inside of the valve housing inner wall over a large area in each case, so that apart from wall sections 83 extending in the direction of the rotational adjusting axis R, the valve housing inner wall is substantially completely lined or covered by the seals. It should be clear, and is also so illustrated in FIG. 4, that the seal supports 26 are shaped accordingly. To secure the position of the seals 25 in the seal supports 26, the seals 25 each form a form-fit engagement with a seal support 26, in this case in the form of a spring-groove connection 85. The spring-groove connections 85 are formed by a plurality of circumferentially distributed protrusion-recess pairs 87, 89. In that the seals 25 are each received and accommodated substantially entirely within the seal supports 26, a continuous, protrusion-free transition is formed between the wall section 83 and the seals 25, which ensures reliable positioning of the valve member 5. In other words, both the seal supports 26 and the seals 25 are adapted to the inner contours/or curvature of the wall sections 83 with respect to their inner contours and/or curvature. Also immediately adjacent to the fluid openings 7, 9, 10, 11, spring-groove connections 85 may be provided for reinforced positional retention between the seal 25 and the seal support 26. By means of the protrusion-recess pair 91, 93, both relative rotation and relative translation of the seal 25 and seal support 26 is prevented.

Figure 5:
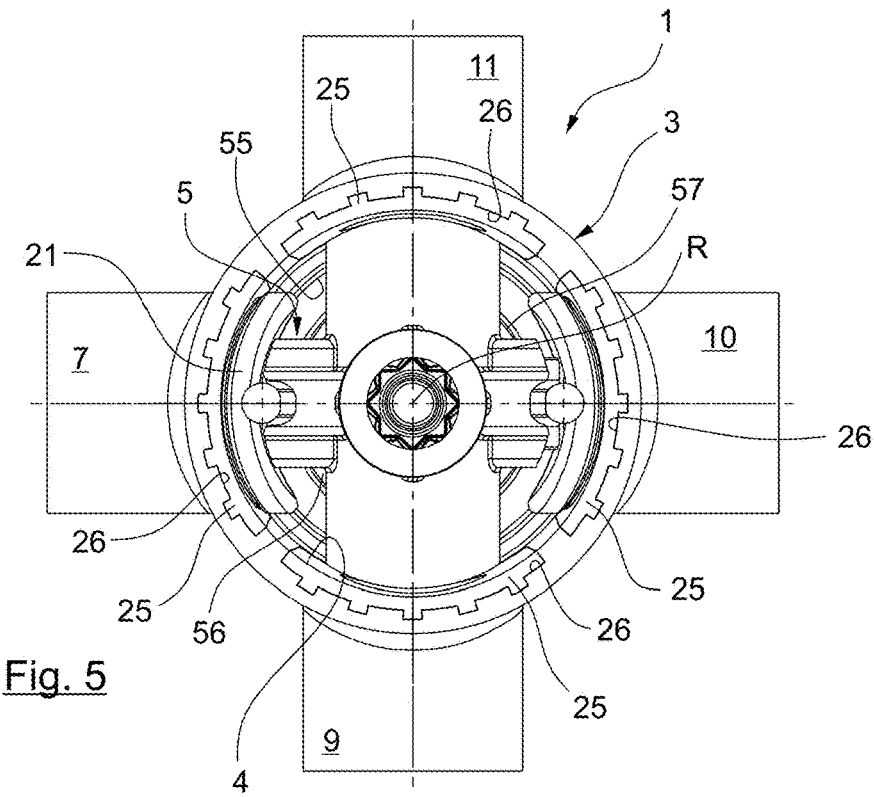
FIG. 5 is a perspective sectional view of a further exemplary design of a directional valve according to the embodiments.
Figure 6:
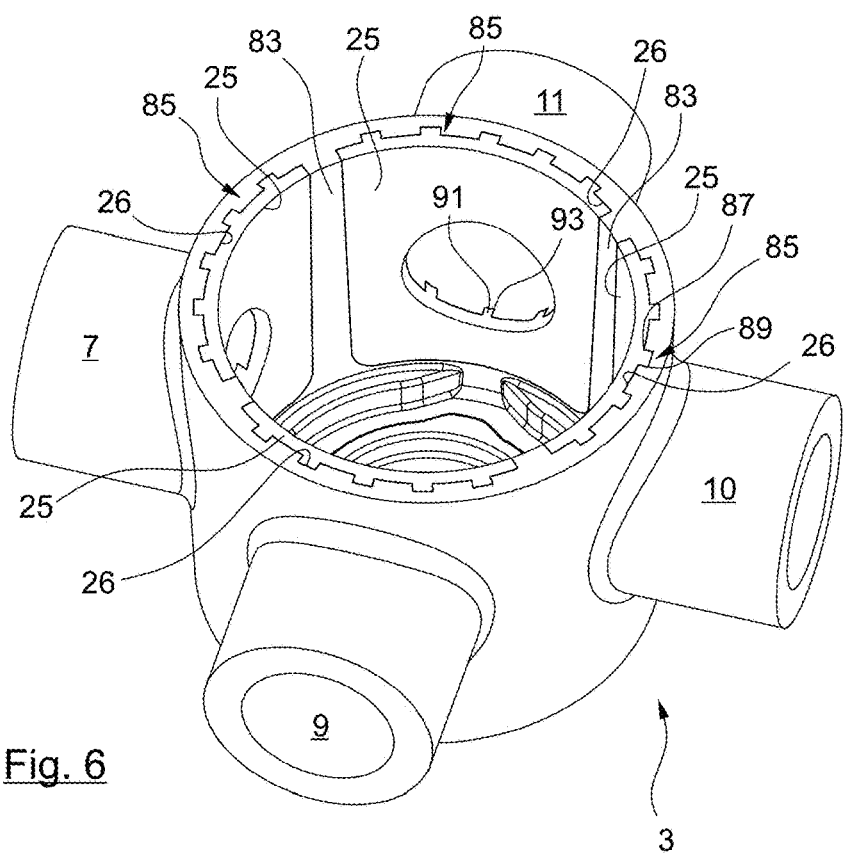
FIG. 6 is a perspective view of a valve housing of the directional valve of FIG. 5.

FIGS. 5 and 6 show another exemplary embodiment of a valve housing 3 and a valve member 5. In contrast to the previous embodiments, the valve member 5 has two sealing parts 21 which are opposite one another in the radial direction with respect to the rotational adjusting axis R, in particular are of identical shape, and are coupled to one another by means of a corresponding slotted link guide 39 in order to realize in each case a possibility of relative movement of the two sealing parts 21 with respect to the single, central adjusting part 19. The valve member 5 according to FIG. 5 is particularly suitable for a 4/2-way valve, whereby two opposing fluid openings 7, 9, 10, 11 can be closed simultaneously by means of the valve member 5. By means of the valve member 5 designed in this way, in each case two opposite fluid openings 7, 9, 10, 11 are closed and the two further opposite fluid openings 7, 9, 11, 10 are released. In other words, the permitted fluid flow through the valve housing 3 takes place in a straight line via two fluid openings 7, 9, 10, 11, which are in particular aligned opposite each other.

In order to guide the fluid flow through the valve housing 3 and, in particular, through the valve member 5, in particular without flow loss, the valve member 5 according to FIG. 5 comprises a central fluid passage 79, which fluidically connects the two fluid openings 7, 9, 10, 11 to be released. An opening cross-section of the fluid passage 79 may be shape-matched with respect to an opening cross-section of the fluid openings 7, 9, 10, 11 of the fluid housing 3. The fluid passage 79 is oriented transversely, in particular perpendicularly, on the one hand with respect to the rotational adjusting axis R and on the other hand with respect to the direction of relative movement of the two sealing parts 21 with respect to the adjusting parts 19. In FIG. 5, it can be seen that when the valve member 5 is pivoted or adjusted, a guide protrusion 53 of each of the two sealing parts 21 is received within the guide groove 45 in the valve housing 3 defining the slotted link path 43 and slides along within the guide groove 45 when the valve member 5 is adjusted. Due to the matching of the slotted link guide 39 and the rail guide 41, which is also present in this embodiment, the two sealing parts 21 are simultaneously urged radially outwardly into the sealing contact switching state with the respective fluid opening 7, 9, 10, 11 by a respective press-on protrusion 59 associated with each of the two opposing fluid openings 7, 9, 10, 11 to be closed. Leaving the sealing contact switching state also occurs analogously and simultaneously for both sealing parts 21.

In FIGS. 5 and 6, the valve housing design 3 from FIG. 4 is shown once in plan view and once in complete perspective view, from which above all the large-area lining of the valve housing inner wall can be seen.

Figure 7A:
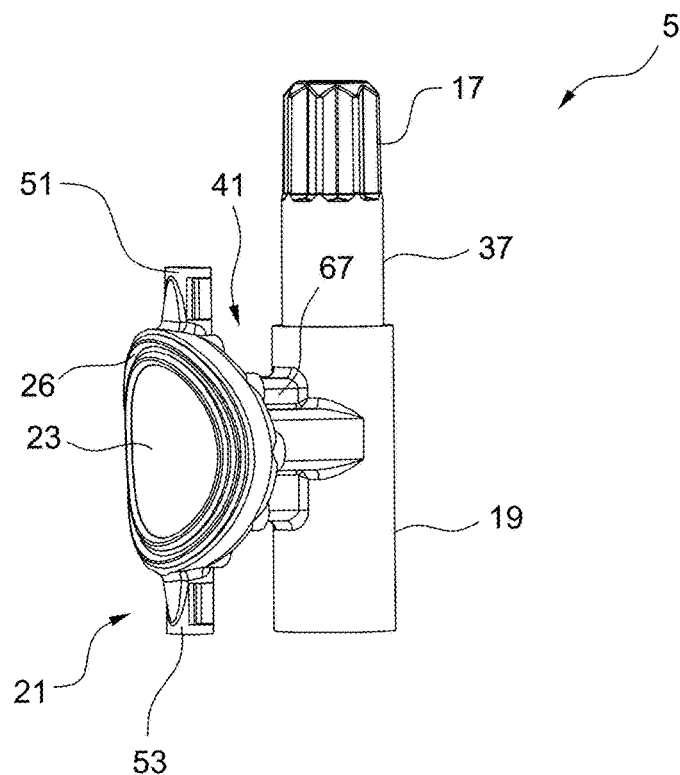
FIG. 7a and FIG. 7b are different perspective views of a valve member of a directional valve according to the embodiments.

FIGS. 7a to 10 illustrate further aspects of the embodiments by describing an exemplary embodiment of a valve housing 3 for a directional valve 1. The sealing part 21 and the adjusting part 19 are shown in an assembled state with each other. The sealing part 21 has a sealing support 26 on an end face 23 which is oriented radially outwards with respect to the rotational adjusting axis R and which serves as a sealing face, in order to achieve an improved fluid-tight closure of the fluid openings 7, 9, 10, 11 (FIG. 7a). The seal support 26 is annular, in particular annular groove-shaped, and is located close to the edge, i.e. radially on the outside of the end face 23.

Figure 7B:
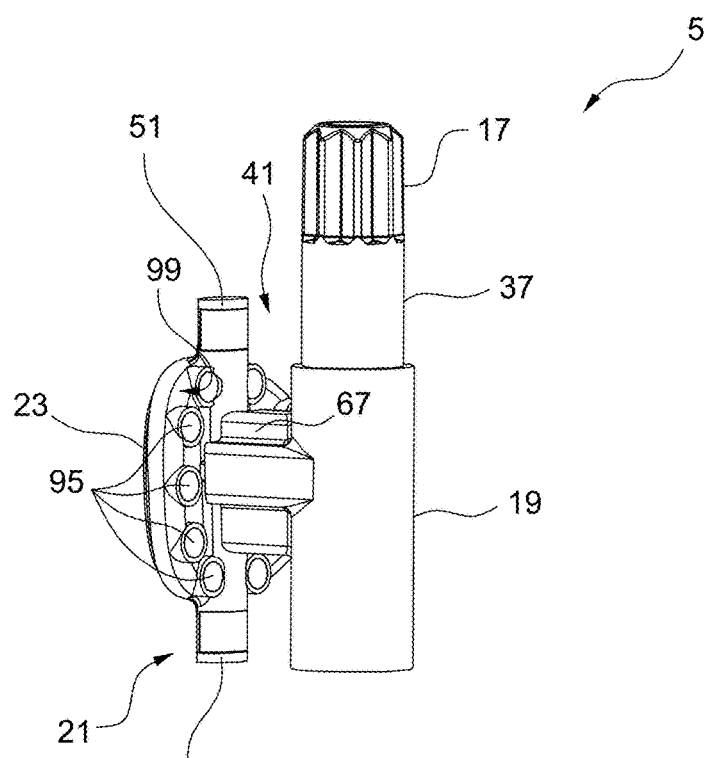

With reference to FIGS. 7b to 10, the barb-like rear engagement of seal 25 and seal support 26 is explained in more detail. As can be seen in FIG. 7b, the seal support 26 includes a plurality of circumferentially distributed form-fit opening 95 for receiving a respective shape-matched protrusion 97 with respect to the form-fit opening 95 so that the seal 25 and the seal support 26 can form-fit engage with each other to prevent them from moving away from each other in a direction opposite to the mounting direction. The form-fit openings 95 are formed as through openings and extend from the front face 23 to the rear face 99. At the rear face 99, the form-fit openings 95 are formed as wood cylindrical sleeves or sockets.

Figure 8:
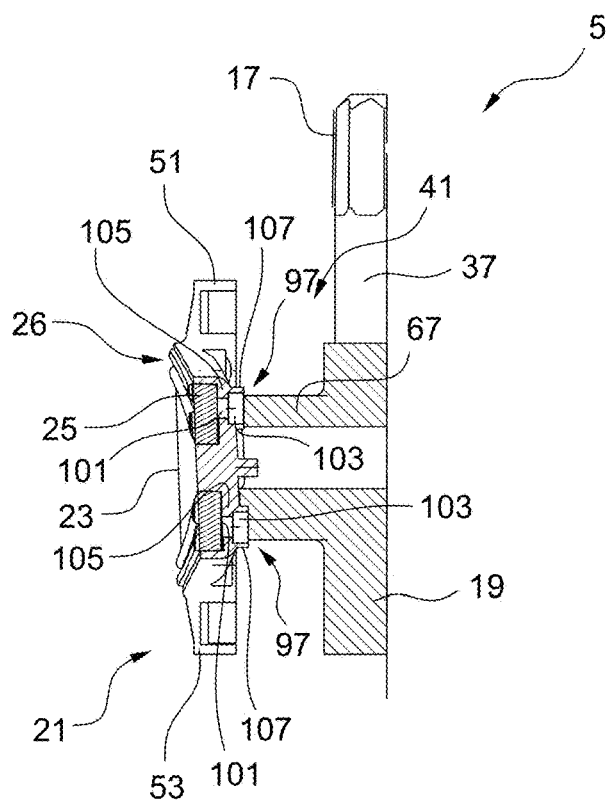
FIG. 8 is a sectional view of the valve member of FIGS. 7a, 7b.

FIG. 8 shows a sectional view of the valve member 5 with the seal 25 mounted. The seal 25 and the seal support 26 are form-matched to each other in such a way that the seal 25 and the seal support 26 engage behind each other in a barb-like manner with respect to the mounting direction. According to the exemplary embodiment in FIG. 8, this is formed by the barb structure in the form of the rotational protrusions 97 projecting from the seal, each of which has a web portion 101, in particular of constant diameter, and a land section 103, in particular a circumferential portion, projecting transversely to the longitudinal extent of the protrusion 97 relative to the web portion 101. The form-fit openings 95 of the seal support 26 formed in the valve member 5 comprise a corresponding shape, namely a web receptacle 105 associated with the web section 101 of the seal 25 and a retaining support 107 associated with the land section 103 and projecting, in particular circumferentially, with respect to the web receptacle 105 transversely to the longitudinal extent of the form-fit opening 95. The seal 25 can, for example, be inserted, in particular pressed or clipped, into the seal support in the mounting direction. The assembly direction is shown schematically in FIG. 9, in which the seal 25 is dismantled with respect to the valve member 5. As can be seen in particular from FIG. 8, the seal 25 is secured against removal from the seal support 26 or away from the valve member 5 via the form-fit engagement of the seal 25 and the seal support 26, or the sealing protrusion 97 and the form-fit opening 95. The barb-like engagement of the land sections 103 in the retaining support 107 behind the radially recessed web receptacles 105 prevents unintentional removal of the seal 25 from the seal support in 26. The land sections 103 interlock with the receiving webs 105 and build up an axial retaining force that prevents unintentional disassembly.

Figure 9:
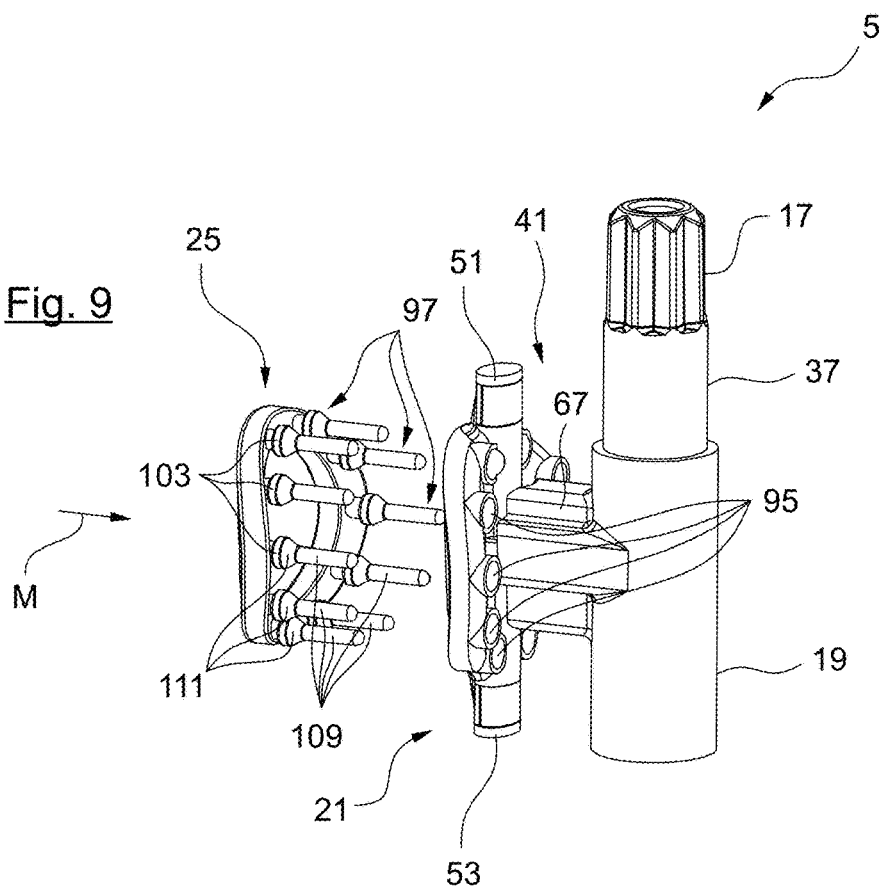
FIG. 9 is a perspective view of a pre-assembly state of a further exemplary design of a valve member of a directional valve according to the embodiments.
Figure 10:
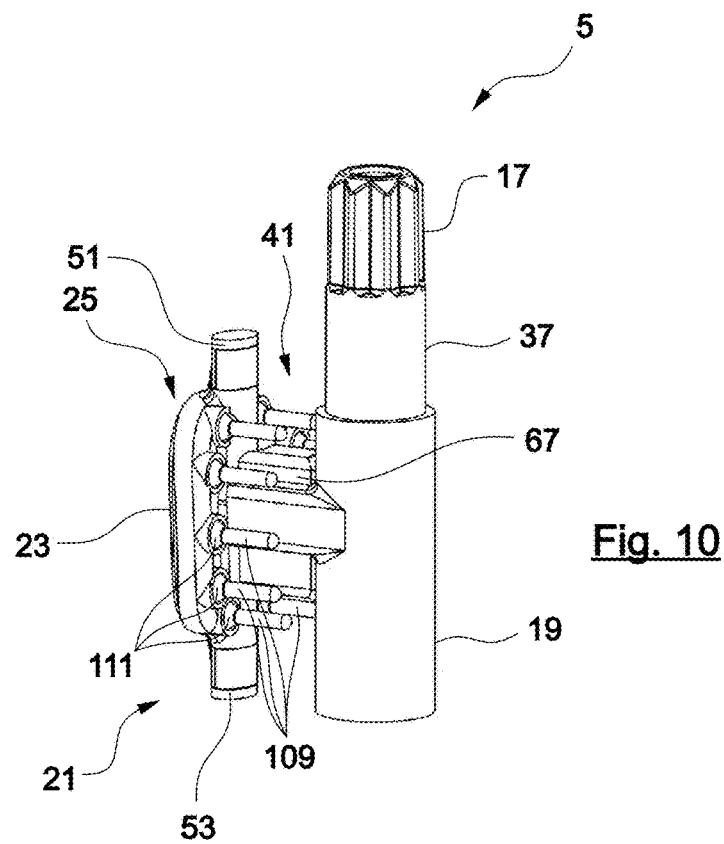
FIG. 10 is a perspective view of an assembly state of the valve member of FIG. 9.

Referring to FIG. 9, in which a disassembly condition is shown with respect to manner an exploded view of FIG. 8, an exemplary embodiment of an annular seal 25 having a plurality of circumferentially distributed sealing protrusions 97 is shown. Each sealing protrusion 97 is associated with a form-fit opening 95 in the valve member 3, so that when the seal 25 is inserted or injected axially into the seal support 26, the sealing protrusions 97 project increasingly into the form-fit openings 95 and protrude at the rear face 99 of the valve member 3 (FIG. 10). The barbed structure of the seal 25 and seal support 26 enables a particularly resistant adhesion-promoter-free attachment of the seal 25 to the valve member 5.

According to an exemplary embodiment, the seal 25 is manufactured from a single piece, in particular by means of an injection molding process. It is possible that the seal 25 is directly injected into the seal support 26 via the manufacturing process, i.e. the injection molding process. Referring again to FIG. 9, it can be seen that the sealing protrusions 97 can have leading guide land 109 which can correspond in diameter to the ridge portions 105. Via the guide land 109, a particularly simple and/or targeted insertion of the seal 25 into the seal support 26 and the corresponding form-fit openings 95 is possible. The transition between the guide land 109 and the land sections 103 can be formed via a conical centering contour 111 which, when the seal 25 is inserted in the mounting direction M into the seal support 26, causes the sealing protrusions 97 to be centered in the form-fit openings 95.

Figure 11:
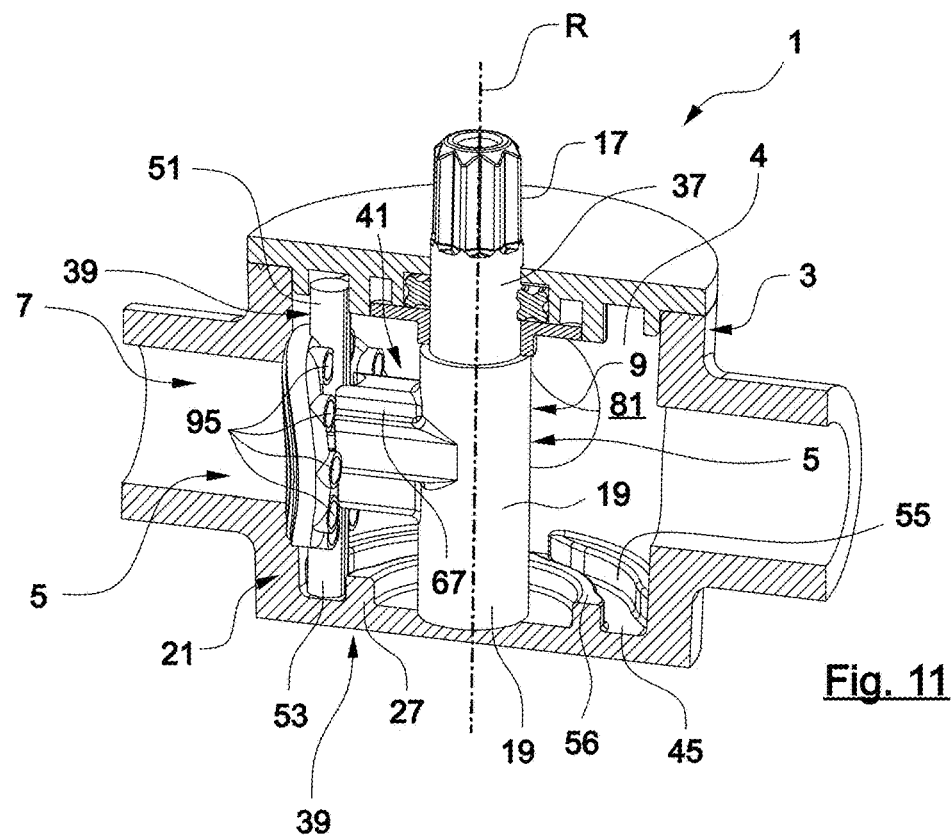
FIG. 11 is a perspective sectional view of a further exemplary embodiment of a directional valve according to the embodiments with the valve member from FIGS. 9, 10.

FIG. 10 shows the corresponding assembly state of the valve member 3 with the seal 25 compared to the disassembly state of FIG. 9. It can be seen that at least the guide land 109 protrude from the form-fit openings 95. From a comparison of FIG. 10 with FIG. 11, which finally shows the installed state of the valve member 3 with mounted seal 25 in the valve housing 5, it can be seen that the guide land 109 have been separated. The guide land 109 may thus be disposable, having no function in the operation of the directional valve 1.

Figure 12:
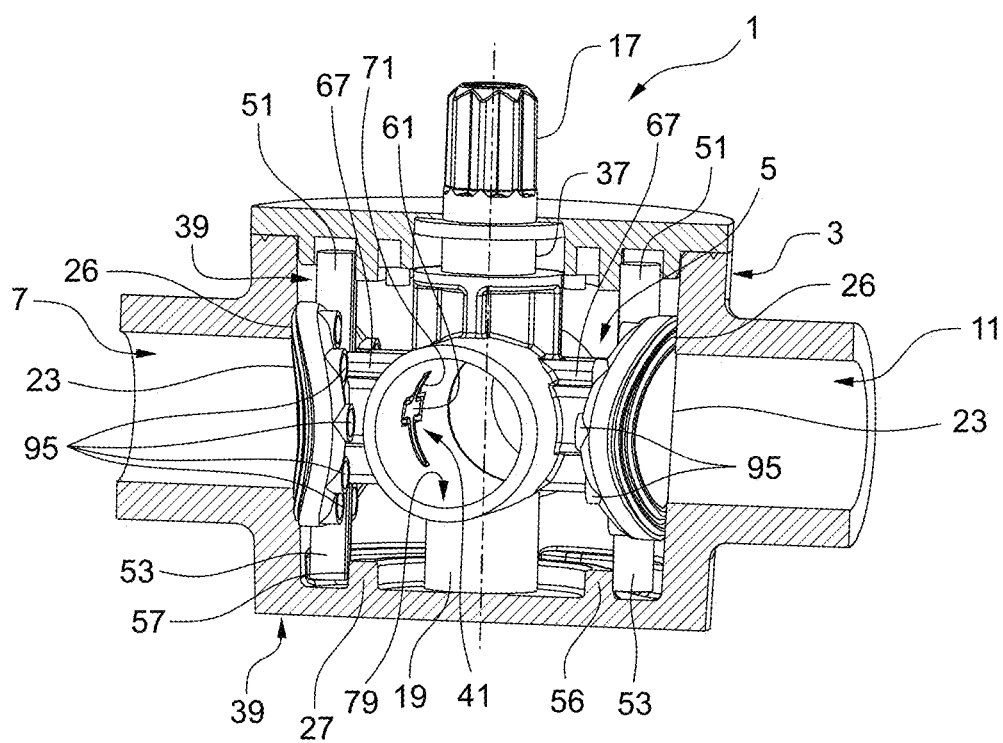
FIG. 12 is a perspective sectional view of a further exemplary embodiment of a directional valve according to the embodiments.

FIGS. 11 and 12 again show the interaction of the valve member 5 and the valve housing 3 for sealingly closing the fluid openings 7, 9, 10, 11, wherein the valve member 5 is formed according to the embodiment of FIG. 10, in FIG. 11 as a single valve member 5 and in FIG. 12 as a double valve member 5 according to the embodiment in FIG. 5.

The features disclosed in the foregoing description, the figures and the claims may be significant both individually and in any combination for the realization of the various embodiments.

LIST OF REFERENCES

1 directional valve
3 valve housing
4 valve housing inner wall
5 valve member
7, 9, 10, 11 fluid opening
13 cover
15 through opening
17 force transmission part
19 adjusting part
21 sealing part
23 sealing surface
25 seal
26 seal support 27 valve housing base
29 bearing
31 circumflential wall
33 recess
35 bearing protrusion
37 shaft
39 slotted link guide
41 rail guide
43 slotted link path
45 guide groove
47 upper side
49 lower side
51, 53 guide protrusion
55, 57 groove wall
56 peripheral web
59 press-on protrusion
61 guide rail
65 guide part of sealing part
67 guide part of the actuator
69 recess
71 guide carriage
79 fluid passage
81 valve interior
83 wall section
85 spring-groove connection
87, 91 protrusion
89, 93 recess
95 form-fit opening
97 sealing protrusion
99 rear face
101 retaining section
103 land section
105 land support
107 holding support
109 guide land
111 centering contour
M mounting direction
R rotational adjusting axis

The invention claimed is:

1. A directional valve for adjusting a fluid flow the directional valve comprising:
a valve housing with at least two fluid openings;
a valve member adjustable between: a closed state to close the at least two fluid openings, and an opened state to at least partially open the at least two fluid openings; and
a seal mounted in a mounting direction (M) in a seal support of the valve member or the valve housing, wherein the seal and the seal support form-fit with one another to prevent the seal and the valve member or valve housing from moving away from one another opposite to the mounting direction (M), wherein:
in the closed state, the valve member is configured to be moved radially outward into sealing contact with the valve housing in which the seal is active in a fluid-tight manner, and
in the open state, the valve member is configured to recess away radially from the valve housing in which the seal is inactive to at least partially open the fluid opening, wherein the radially outward movement and the radially recessing away of the valve member are based on a circumferential movement of the valve member in the valve housing.

2. The directional valve according to claim 1, wherein the seal support and the seal are form-matched to one another so that the seal and the seal support engage behind one another in a barb-like manner with respect to the mounting direction (M).

3. The directional valve according to claim 2, wherein the seal is produced from one piece through an injection molding process, and has a barb structure, by which the seal is firmly attached, without adhesion promoters, to the valve member or the valve housing, wherein the seal is injected into the seal support.

4. The directional valve according to claim 3, wherein the barb structure is formed as a rotational protrusion, projecting from the seal and having a web portion of constant diameter, and a circumferential retaining portion projecting with respect to the web portion transversely to a longitudinal extension of the protrusion.

5. The directional valve according to claim 4, wherein the seal has at least two identically shaped protrusions arranged at a uniform distance from one another, wherein the seal is realized as a sealing ring.

6. The directional valve according to claim 1, wherein the seal support is annular-groove-shaped, and has at least one form-fit opening for receiving at least one protrusion of the seal, with respect to which the at least one protrusion of the seal is form-fitted.

7. The directional valve according to claim 6, wherein the seal form-fit opening is shaped in such a way that the at least one protrusion and the at least one form-fit opening engage behind each other in a barb-like manner with respect to the mounting direction (M) of the seal.

8. The directional valve according to claim 7, wherein the at least one form-fit opening has a web receptacle associated with a web portion of the seal and a retaining receptacle associated with a retaining portion of the seal and projecting circumferentially with respect to the web receptacle transversely to a longitudinal extent of the form-fit opening.

9. The directional valve according to claim 1, wherein the seal support is formed close to an edge in a sealing part of the valve member and arranged to make sealing contact with the valve housing or close to the fluid opening in a valve housing wall bounding the at least two fluid openings.

10. A motor vehicle thermal management fluid control system for a motor vehicle cooling circuit, comprising a directional valve formed according to claim 1.

11. The directional valve according to claim 1, wherein:
in the closed state, the valve member is configured to be urged radially outward, based on the circumferential movement, to engage the valve housing to provide the sealing contact; and
in the open state, the valve member is configured to move radially inward, based on the circumferential movement, to disengage from the valve housing to at least partially open the fluid opening.

12. A directional valve for adjusting a fluid flow, comprising:
a valve housing with at least two fluid openings fluidly connected to a valve interior bounded by the valve housing;
at least one seal support;
a valve member actuatable between: a closed state to close the at least two fluid openings, and an opened state to at least partially open the at least two fluid openings; and
a seal injected by an injection molding process from the valve interior into the at least one seal support and manufactured in one piece, wherein:
in the closed state, the valve member is configured to be moved into sealing contact with the valve housing in which the seal around one of the fluid openings is active in a fluid-tight manner, the valve member being urged radially outward to engage the seal to provide the sealing contact, and in the open state, the valve member is configured to recess away from the valve housing in which the seal is inactive to at least partially open the fluid opening, the valve member being moved radially inward to disengage from the valve housing to at least partially open the fluid opening, wherein the radially outward movement and the radially inward movement of the valve member are based on a circumferential movement of the valve member in the valve housing.

13. The directional valve according to claim 12, wherein the seal is shaped such that the seal is form-fitted to an inner contour of a valve housing wall of the valve housing, and merges continuously and without protrusion into a wall contour.

14. The directional valve according to claim 13, wherein the seal is arranged in the at least one seal support in such a way that a rotation of the seal relative to the seal support with respect to an adjusting axis of the valve member and a translation of the seal relative to the seal support in the direction of the adjusting axis is prevented.

15. The directional valve according to claim 14, wherein the seal and the seal support build a form-fitting engagement in the form of a spring-groove connection.

16. The directional valve according to claim 15, wherein the seal lines the valve housing wall around one of the at least two fluid openings of the valve housing.

17. The directional valve according to claim 12, wherein:
the at least one seal support comprises at least one protrusion and at least one recess that are circumferentially distributed on the valve interior; and
the at least one seal comprises at least one protrusion and at least one recess that are configured and arranged to mate with the at least one protrusion and the at least one recess of the at least one seal support to establish a form-fitting engagement between at least one seal and the at least one seal support.

18. The directional valve according to claim 15, wherein the spring-groove connection comprise a plurality of circumferentially distributed protrusion-recess pairs formed by protrusions and recesses in the at least one seal support and the at least one seal.

* * * * *